Jan. 21, 1958 S. W. HAYES 2,820,420
METAL WORKING APPARATUS
Original Filed Dec. 28, 1943 2 Sheets-Sheet 1
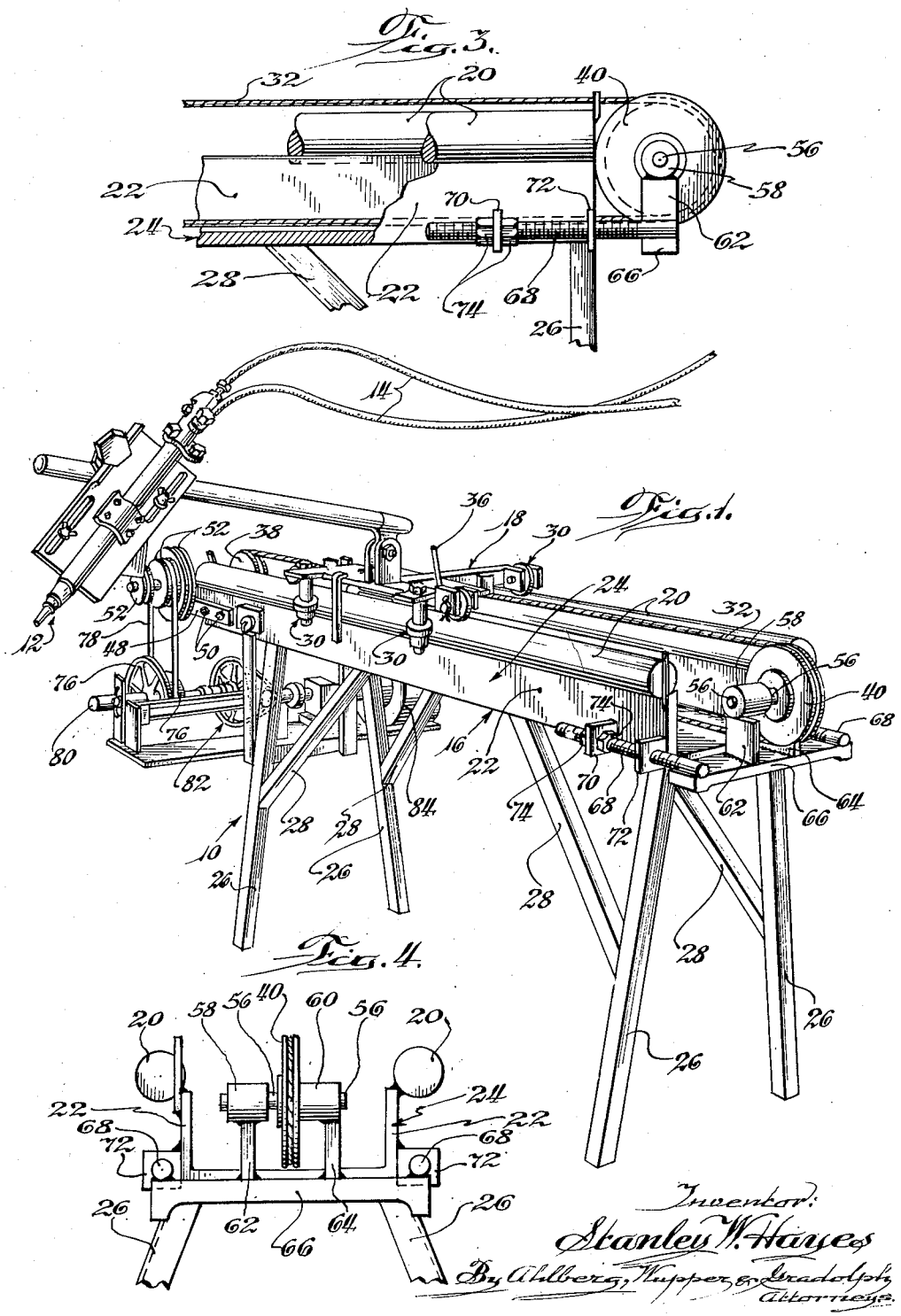

Jan. 21, 1958 S. W. HAYES 2,820,420
METAL WORKING APPARATUS
Original Filed Dec. 28, 1943 2 Sheets-Sheet 2
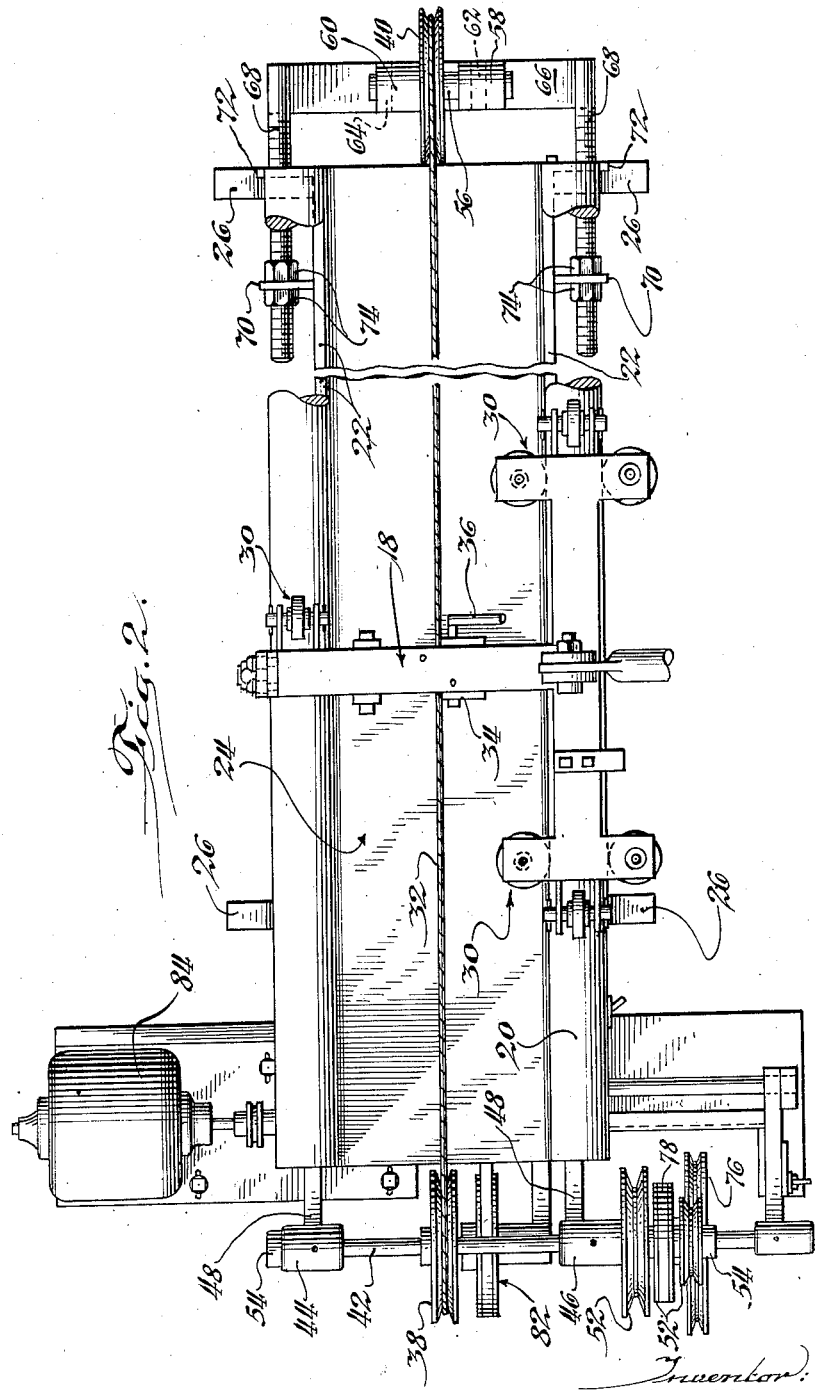

2,820,420

METAL WORKING APPARATUS

Stanley W. Hayes, Richmond, Ind., assignor to Hayes Track Appliance Company, Richmond, Ind., a corporation of Indiana Application April 27, 1949, Serial No. 89,840, now Patent No. 2,660,128, dated November 24, 1953, which is a division of application Serial No. 515,937, December 28, 1943, now Patent No. 2,481,421, dated September 6, 1949. Divided and this application July 24, 1953, Serial No. 370,176.

2 Claims. (Cl. 104—196)

The present invention relates to metal working apparatus, and in particular to improvements in the driving means for the movable carriage of a straight line torch cutting machine.

This application is a division of the copending application of Stanley W. Hayes, Serial No. 89,840, filed April 27, 1949, now issued into Patent No. 2,660,128, dated November 24, 1953, which in turn was a division of an application of Stanley W. Hayes, Serial No. 515,937, filed December 28, 1943, and now issued as Patent 2,481,421 dated September 6, 1949.

In the past most of the straight line torch cutting machines comprised a small, motor-operated torch supporting carriage movable upon a track on the work. Machines of this character are not adapted for cutting plates other than big ones, whereas an advantage of the apparatus of the present invention is that it can be used to cut up small pieces such as scrap whenever straight line cuts are desired.

Pantograph machines have sometimes been used but these have the disadvantage that it is necessary manually to guide the tracing wheel. As compared with machines of this character, the apparatus of the present invention is simpler to construct and easier to operate; even when made of sufficient length to cut long straight lines, it will not have unwieldy dimensions as would the pantograph machine.

The metal working apparatus described in the previously mentioned patents comprises a longitudinally extending track structure upon which is movable a carriage which supports the torch structure per se. The source of power is mounted at one end of the track structure and through variable speed pulley arrangements drives an endless cable which may be selectively clutched to the movable carriage so that the latter is moved on the track structure at the desired speed.

It is the principal object of the present invention to provide a new and improved metal working apparatus wherein the movable carriage is driven along the track structure by an endless cable, and the endless cable may be adjusted to maintain it at the proper tension.

Another object is to provide a new and improved metal working apparatus wherein an endless cable is provided for driving a movable carriage along a track structure, the endless cable being carried on a pair of pulleys or sheaves, at least one of which may be adjusted with respect to the track structure so as to maintain a proper tension upon the cable.

Another object is to provide a new and improved metal working apparatus of the above described type wherein the adjustable pulley or sheave may be easily and quickly adjusted and securely locked in adjusted position.

Other objects and advantages will become apparent from the following description taken in conjunction with the accompanying drawings, wherein:

Fig. 1 is a general perspective view of the metal working apparatus of the present invention viewed from the front and that end provided with the cable tension adjustment means;

Fig. 2 is a plan view of the apparatus;

Fig. 3 is an elevational view partially broken into section of that end of the apparatus shown nearest the viewer in Fig. 1; and Fig. 4 is an end elevational view looking at the right end of the apparatus as shown in Fig. 3.

As more fully illustrated and described in the aforementioned patents, the metal working apparatus of the present invention, indicated generally by the reference character 10, is a cutting apparatus of the type employing a torch 12 which may be supplied with a combustible medium through flexible conduits 14 from a tank or tanks (not shown). The apparatus 10 includes a stationary support 16 and a torch supporting carriage 18 movably mounted on the stationary support.

The stationary support includes a pair of parallel tracks 20 preferably made of cold rolled shafting secured as by welding to the upper outer corners of the upwardly extending flanges 22 of a ship building channel 24 supported in horizontal position on four legs 26 which are suitably braced to the channel by diagonal braces 28. The legs and braces may be welded to each other and to the transverse portion of the channel 24, thereby to provide a simple and sturdy supporting frame for the apparatus.

The torch supporting carriage 18 is movably mounted upon the stationary support and specifically upon the shafting 20, which thus constitute "ways" for the carriage. In the specific embodiment illustrated, the carriage 18 supports the torch 12, but it should be understood that many of the principles of the present invention may be embodied in an apparatus where the torch is fixed and the work is mounted on the carriage for movement with respect to the torch. Furthermore, a plurality of torches can be mounted upon the carriage 18. The particular mounting of the torch 12 and the construction of the movable carriage 18 is disclosed and described in the aforementioned patents and need not be repeated herein except to note that the carriage is provided with a three point support 30 on the shafting 20 and is so arranged that the weight of the torch structure is prevented from tilting the carriage 18 from the track structure.

The carriage is driven from an endless cable 32 to which it may be secured by a clutch 34 manually operable by means of a lever 36. The cable 32 is mounted upon a pair of pulleys or sheaves 38 and 40, the latter of which is adjustable relative to the former and to the stationary support 16. The pulley 38 is fixedly secured to a drive shaft 42 journalled for rotation in a pair of spaced apart bearings 44, 46, suitably secured to the upright flanges 22 of the channel 24 as by supporting arms 48 to which the bearings are secured as by welding, and which are in turn secured to the flanges 22 in any suitable manner such as by the bolts 50.

The pulley 38 is located between the bearings 44 and 46 while a plurality of different diameter pulleys 52 are secured to that end of the shaft 42 projecting beyond the bearing 46. Undesired endwise movement of the shaft 42 is prevented by collars 54 secured to its opposite ends.

The adjustable pulley 40 is mounted on a shaft 56 journalled for rotation in a pair of bearings 58 and 60. The bearings 58 and 60 are secured as by welding to the upper sides or edges of a pair of uprights 62, 64, secured in turn to a horizontal supporting plate 66 which is adjustably mounted relative to the stationary support 16. At its opposite ends the plate 66 is secured as by welding to and supported on the outer ends of a pair of relatively long studs 68 movable into adjusted positions relative to the stationary support 16 and capable of being secured in such adjusted position.

Each stud 68 extends through a pair of longitudinally spaced apart, transversely projecting lugs 70, 72 secured to the flanges 22 of the channel 24, each pair of the lugs being formed with aligned apertures to receive the stud. Each stud 68 is held in adjusted position by a pair of locking nuts 74 located at opposite sides of the lug 70. It is thus a relatively simple matter to place the required tension on the endless cable 32, it merely being necessary to loosen one or both of the nuts 74 and move the plate 66 carrying the adjustable pulley 40 until the requisite tension has ben placed upon the endless cable 32. When the proper position of the plate 66 has been obtained, the nuts 74 are tightened against the lugs 70. In view of the fact that each stud 68 passes through a pair of aligned, longitudinally spaced apart apertured lugs 70, 72, and is locked to the lug 70, there is no possibility of the tension on the cable 32 pulling the subassembly of pulley 40, bearings 56, 58, uprights 62, 64, and mounting plate 66 toward the center of the channel, or with specific reference to Fig. 3, there is no possibility of the cable tension swinging it in the counterclockwise direction. The anchored studs, therefore, support the pulley 40 in its adjusted position beyond the end of the trackway.

If desired the same or similar arrangement might be provided for the pulley 38, although, as a matter of commercial practice, it has been found to be unnecessary to provide for adjustment of more than one of the two pulleys.

The cable 32 is preferably a steel cable having its ends spliced and soldered but it could be a perforated steel ribbon, a link belt chain, or the like.

As explained more fully, particularly in Patent 2,481,421, the drive shaft 42 may be driven at a plurality of speeds from a set of driving pulleys 76 and mounted on a jack shaft 80 selectively connected to the pulleys 52 by a belt 78. The pulleys 76 are driven by a drive means indicated generally by the reference character 82 and which includes a source of motive power such as the electric motor 84. Since this part of the apparatus forms no part of the present invention, it need not be described in greater detail herein.

From the foregoing description it is clear that there has been provided, by the apparatus disclosed in the foregoing specification and in the drawings, a very simple means for adjusting the tension on an endless cable which is suitable for driving a carriage in a torch cutting apparatus of the type generally described, and that the objectives which are claimed for this invention have been fully obtained.

While a single embodiment of the cable tension adjusting means constituting the invention has been shown and described, it will be apparent that numerous modifications and variations thereof may be made without departing from the underlying principles of the invention. It is, therefore, desired by the following claims to include within the scope of the invention all such variations and modifications by which substantially the results of this invention may be obtained through the use of substantially the same or equivalent means.

What is claimed as new and desired to be secured by United States Letters Patent is:

1. A metal working apparatus including in combination a longitudinally extending member having a pair of parallel spaced upright portions and a transverse portion interconnecting said upright portions below their upper ends, pulleys at the opposite ends of said member, a transversely extending plate positioned beyond one end of said longitudinally extending member and mounting one of said pulleys, a pair of aligned transversely projecting apertured lugs secured to the outer face of each of said uprights at the end of said member adjacent said one pulley, studs fixedly secured to said plate and projecting through said apertured lugs adjustably to mount said plate and said one pulley to said member, and nut means adjustably locking each of said studs to one lug of each of said pair of lugs.

2. In a metal working apparatus having a structure forming a longitudinally extending trackway, endless cable supporting pulleys at the opposite ends of the trackway, and an endless cable supported thereon, the combination comprising, a plate disposed transversely of the trackway beyond one end thereof and positioned below one of the pulleys, means upstanding from said plate and rotatably mounting said one pulley on said plate, a pair of relatively long studs straddling the trackway structure, one end of each of said studs being secured to said plate, two pairs of lugs secured to the trackway structure at opposite sides thereof, each pair having aligned apertures therein to receive the other end of one of said studs, and means anchoring each stud to one lug of the pair, whereby said one pulley is adjustably mounted at one end of the trackway to insure proper tension on the endless cable.

References Cited in the file of this patent

UNITED STATES PATENTS

| | | |
|---|---|---|
| 761,484 | Hetzel | May 31, 1904 |
| 843,116 | Strambini | Feb. 5, 1907 |
| 875,685 | Bighouse | Jan. 7, 1908 |
| 2,285,636 | Wallace | June 9, 1942 |
| 2,320,264 | Chapman | May 25, 1943 |
| 2,481,421 | Hayes | Sept. 6, 1949 |